US006723973B2

(12) United States Patent
Saito

(10) Patent No.: US 6,723,973 B2
(45) Date of Patent: Apr. 20, 2004

(54) METHOD FOR INSPECTING ACCURACY IN STITCHING PATTERN ELEMENTS USING CAD OR PATTERN REFERENCE DATA

(75) Inventor: Manabu Saito, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 10/293,977

(22) Filed: Nov. 13, 2002

(65) Prior Publication Data

US 2003/0126566 A1 Jul. 3, 2003

(51) Int. Cl.[7] ............................. G06K 9/00; G06K 9/62
(52) U.S. Cl. ................................. 250/49.22; 250/491.1; 382/144; 382/145; 430/296; 716/4; 716/5; 716/21; 238/151
(58) Field of Search ...................... 250/492.22, 491.1; 382/144, 145; 430/296; 716/4, 5, 21; 238/151

(56) References Cited

U.S. PATENT DOCUMENTS 6,396,943 B2 * 5/2002 Yamashita ................. 382/144

OTHER PUBLICATIONS

U.S. patent application Publication No. US 2002/0028012 A1, Published Mar. 7, 2002.

"Evaluation of an advanced mask writing system", of Shinji Kubo et al., Part of the SPIE Symposium on Photomask and X–Ray Mask Technology VI, Yokohama, Japan, Sep. 1999, SPIE vol. 3748, pp. 426–435.

* cited by examiner

Primary Examiner—John R. Lee
Assistant Examiner—James J. Leybourne
(74) Attorney, Agent, or Firm—Webb Ziesenheim Logsdon Orkin & Hanson, P.C.

(57) ABSTRACT

A method of quickly and accurately inspecting the stitching accuracy at which regions of a lithographic pattern are stitched at boundaries. The numerous regions of the lithographic pattern are exposed or drawn, one at a time. Inspected regions are scanned with a charged-particle beam to detect secondary electrons. The obtained signal is stored as an inspected image in an image memory, together with positional data about the inspected regions. After completion of acceptance of image from all the inspected regions, the inspected image is compared with a separately prepared reference image by an image processing unit. Pattern elements in the inspected regions corresponding to the reference image are extracted. Deviations at field boundaries or the like can be detected from the relative positions of these pattern elements, if any.

8 Claims, 13 Drawing Sheets

METHOD FOR INSPECTING ACCURACY IN STITCHING PATTERN ELEMENTS USING CAD OR PATTERN REFERENCE DATA

BACKGROUND OF THE INVENTION

1. Field of the Invention

The present invention relates to a method of inspecting the stitching (or connecting) accuracy in stitched pattern elements that are lithographically formed in desired regions successively on a semiconductor wafer, a liquid crystal panel, a mask, or the like, using an exposure system, such as an electron-beam lithography system during the process of fabrication of semiconductor devices, a mask, or the like.

2. Description of Related Art

In an electron-beam lithography machine, an electron beam is deflected according to a desired pattern. Thus, the desired pattern is drawn. A variable-shaped beam (VSB) lithography machine is one of such electron-beam lithography machines. In this VSB lithography machine, a deflector mounted between two rectangular apertures shapes the cross section of an electron beam into a rectangle.

In particular, the image of the first rectangular aperture is projected onto the second rectangular aperture. The electron beam passed through the first rectangular pattern is deflected to vary the projection position on the second rectangular aperture. An electron beam having a different cross-sectional area is formed. This shaped electron beam is directed (shot) onto a material on which a desired pattern is to be drawn.

One example of this variable-shaped beam lithography machine is shown in FIG. 1, where an electron gun 1 emits an electron beam EB that is directed onto a first shaping aperture 3 via an illumination lens 2.

The image of the aperture of the first shaping aperture 3 is focused onto a second shaping aperture 5 by a shaping lens 4. The position of the focus can be varied by a shaping deflector 6. The image shaped by the second shaping aperture 5 is directed onto a material 9 on which a desired pattern is to be drawn, via a reduction lens 7 and via an objective lens 8. The position on the material 9 struck by the image can be changed by a positioning deflector 10.

A control CPU 11 routes pattern data from a pattern data memory 12 to a data transfer circuit 13. The pattern data from the data transfer circuit 13 is sent to a control circuit 14, another control circuit 15, a further control circuit 16, and a blanking control circuit 18. The control circuit 14 controls the shaping deflector 6. The control circuit 15 controls the positioning deflector 10. The control circuit 16 controls excitation of the objective lens 8. The blanking control circuit 18 controls a blanking electrode 17 for blanking the electron beam generated from the electron gun 1.

A shot (exposure) time correcting memory 19 is connected with the blanking control circuit 18. The blanking signal from the blanking control circuit 18 is corrected according to the value from the shot time correcting memory 19. The control CPU 11 controls a driver circuit 21 for a stage 20 on which the material 9 is placed, to move the material across each field. The operation of this structure is next described.

The fundamental drawing operation is first described. Pattern data stored in the pattern data memory 12 is read out successively and sent to the data transfer circuit 13. The deflection control circuit 14 controls the shaping deflector 6 according to the data from the data transfer circuit 13. The control circuit 15 controls the positioning deflector 10.

As a result, the cross section of the electron beam is shaped into each individual element of the desired pattern by the shaping deflector 6. The elements of the pattern are successively shot onto the material 9, thus drawing the desired pattern. At this time, a blanking signal is sent from the blanking control circuit 18 to the blanking electrode 17, so that the electron beam is blanked in synchronism with the bombardment of the material 9 by the electron beam.

Where a different region on the material 9 is written lithographically, an instruction is given from the control CPU 11 to the stage driver circuit 21, causing the stage 20 to move a desired distance. The distance traveled by the stage 20 is monitored by a laser interferometer (not shown). The position of the stage is accurately controlled according to the results of measurements obtained by the laser interferometer.

Where a pattern is drawn on a resist lying on a wafer by the aforementioned electron beam lithography system or other system to form an LSI pattern, the electron beam deflection range of the system is up to only about 5 mm square for a single die, or chip, 10 to 20 mm square. Where a pattern of a structure, such as an LSI gate chain, is formed, it is necessary to form a pattern stitched (connected) over the whole chip.

Accordingly, in order to form such a pattern, the stage carrying the wafer and the electrical deflection system are so controlled that pattern elements are stitched at intervals of 5 mm. Therefore, in the system shown in FIG. 1, the positioning deflector 10 is shown to consist of a single deflection system. In practice, a main (or primary) deflector for deflection at intervals of 5 mm is mounted. For deflection within a range less than 5 mm, a secondary deflection system or a ternary deflection system is provided. For example, the deflection range of the secondary deflection system is 500 $\mu$m. The deflection range of the ternary deflection system is 50 $\mu$m.

As a lithography system other than the variable-shaped beam lithography system shown in FIG. 1, a system using a cell projection lithography technique has been developed. In this system, an aperture having tens of patterns built therein is placed into the electron beam path. The electron beam passed through this aperture is reduced to $\frac{1}{25}$ and directed to a resist applied to the wafer. A pattern is written to a cell 5 $\mu$m square at maximum per shot. Since the shot position can be specified with arbitrary coordinates, a space may be formed between successive cells. The boundaries (or stitches or joints) between the successive cells can be brought into contact with each other. These boundaries are hereinafter referred to as shot boundaries. With this structure, any desired pattern ranging from a small pattern of 0.1 $\mu$m to a large pattern covering the whole chip can be drawn at will.

In the chip lithographically written by the aforementioned electron beam lithography system and having a size of 10 mm square, the number of field boundaries reaches 40,000. The number of boundaries of the cells amounts to 4 million. This is illustrated in FIG. 2, where a number of chips T are formed within a wafer W. Each chip T is virtually divided into main fields F1. Each main field F1 is virtually divided into subfields F2. Each subfield F2 is virtually divided into sub-subfields F3.

For example, the size of the chip T is 10 mm×10 mm. The size of each main field F1 is 5,000 $\mu$m×5,000 $\mu$m. The size of each subfield F2 is 500 $\mu$m×500 $\mu$m. The size of each sub-subfield F3 is 50 $\mu$m×50 $\mu$m.

In the electron beam lithography system, the drawn region is virtually divided into smaller regions. The pattern is drawn for each smaller region. That is, after a certain region is written, the stage is moved, and then the main deflection system or secondary or ternary deflection system is so controlled as to write a pattern element to the adjacent region. As a result, the drawn pattern elements may be misaligned at the interface B (field boundary or shot boundary) between the adjacent different regions. The space between the pattern elements may produce an error.

FIGS. 3(a)–3(c) illustrate deviations of pattern elements at the field interface B. A pattern should be formed as shown in FIG. 3(a). The pattern elements may be misaligned in the Y-direction as shown in FIG. 3(b). As shown in FIG. 3(c), the pattern elements may be misaligned in the X-direction, thus splitting the pattern. In FIGS. 3(a)–3(b), the broken lines indicate the interface.

At the field interface in the pattern as shown in FIG. 3(b), the amount of allowable deviation is less than one-tenth the design dimension because of the performance of the LSI. For example, in the case of the pattern width of 0.1 $\mu$m, the allowable deviation is less than 10 nm. In FIG. 3(c), the pattern elements that should be stitched break. This is not allowed because of the actual performance of LSI. Where the amount of deviation is in excess of the maximum allowable value, the electron beam lithography system has a misadjustment. Therefore, it is necessary to find the misadjustment and to readjust the system.

In order to find where a fault is present within the electron beam lithography system, it is necessary that a pattern be drawn on the chips over the whole wafer, the numerous boundaries within the chips be inspected, and the amounts and directions of deviations of the pattern elements at the boundaries be measured. The results of the measurements permit misadjustments in the electron beam lithography system to be estimated empirically. If the misadjustments are found, then it is possible to readjust or repair the electron beam lithography system appropriately.

SUMMARY OF THE INVENTION

It is an object of the present invention to provide a method of quickly and accurately inspecting the accuracy at which pattern elements that have been separately lithographically written are stitched at boundaries.

The present invention provides a method of inspecting the accuracy at which desired regions on a material are stitched, the material having been exposed successively to form a pattern, the method comprising establishing an inspected area over plural different exposed regions, the inspected area containing at least two pattern positions at which a certain pattern appears; detecting a signal arising from the inspected area and detecting the pattern positions from the detected signal; finding the difference between each pattern position within a reference area corresponding to the inspected area and a respective one of pattern positions based on CAD data or pattern data and making data about the difference ancillary to image data about the reference area; comparing the pattern positions in the inspected area with the pattern positions in the reference area; and correcting the results of the comparisons using the differences.

The present invention also provides a method of inspecting the accuracy at which desired regions are stitched on a material on which regions are exposed successively to form a pattern, the method comprising establishing an inspected area over plural different exposed regions, the inspected area containing at least two pattern positions at which a certain pattern appears; detecting a signal arising from the inspected area and detecting the pattern positions from the detected signal; correcting first data about the reference area corresponding to the inspected area by the use of second data made ancillary to the first data to thereby find pattern positions within the reference area at which the certain pattern appears; and comparing the pattern positions within the inspected area with the found pattern positions.

Furthermore, the present invention provides a method of inspecting the accuracy at which desired regions are stitched on a material on which regions are exposed successively to form a pattern, the method comprising establishing an inspected area over plural different exposed regions, the inspected area containing at least two pattern positions at which a certain pattern appears; creating a reference image based on data about a reference area corresponding to the inspected area; dividing the whole field of view of the reference image into two subfields of view; establishing a frame having a given size around the center of each of the subfields of view; detecting pattern positions within each frame at which the certain pattern appears; detecting a signal produced from the inspected area and forming an inspected image; detecting pattern positions within the inspected area corresponding to the certain pattern within each frame established in the reference image; and comparing the pattern positions within the inspected area with the pattern positions within the reference area.

Other objects and features of the invention will appear in the course of the description thereof, which follows.

DESCRIPTION OF THE PREFERRED EMBODIMENTS

Figure 1:
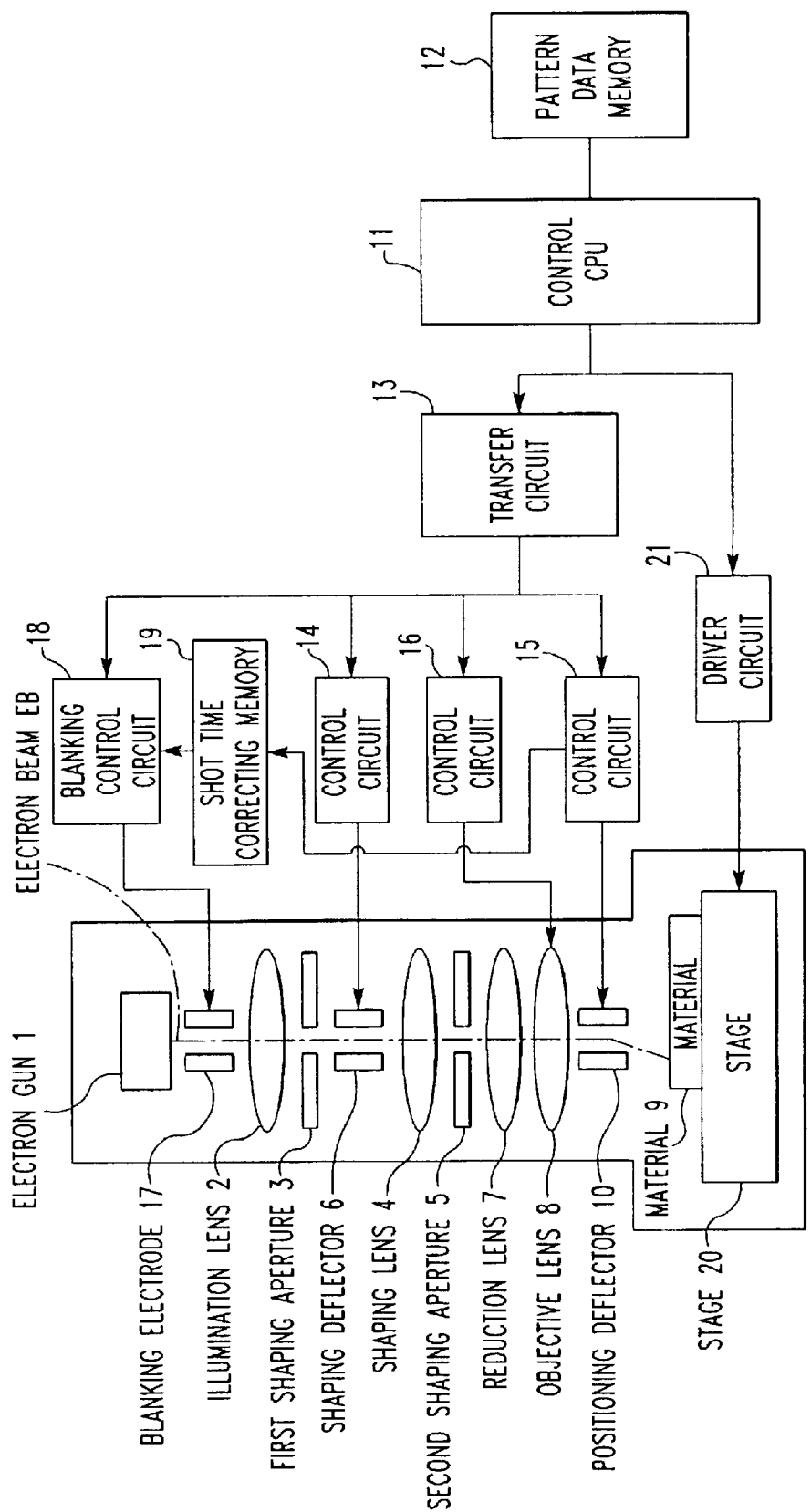
FIG. 1 is a block diagram of a variable-shaped beam lithography machine.
Figure 4:
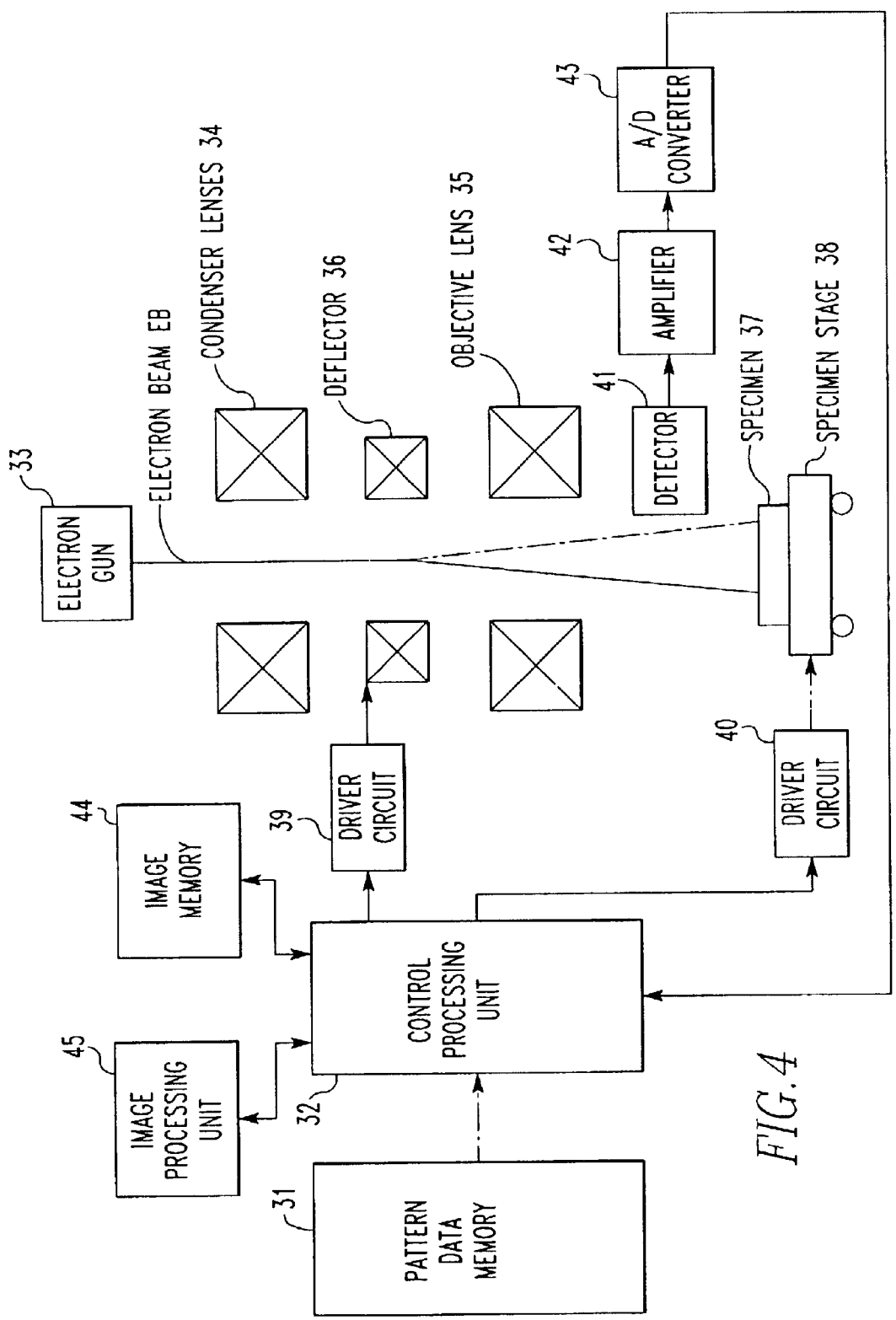
FIG. 4 is a schematic diagram of a fundamental system for carrying out an inspection method in accordance with the present invention.

Referring to FIG. 4, there is shown one example of a fundamental system for carrying out an inspection method embodying the concept of the present invention. This system has a pattern data memory 31 in which data about a pattern to be drawn by the electron beam lithography system of FIG. 1 is stored. The pattern data in the memory 31 is sent to a control processing unit 32 forming a part of the inspection system.

The control processing unit 32 controls a scanning electron microscope (SEM) included in the inspection system. The SEM comprises an electron gun 33, a system of condenser lenses 34, an objective lens 35, a deflector 36, and a movable specimen stage 38 carrying a specimen 37 thereon.

An electron beam EB generated from the electron gun 33 and accelerated is sharply focused onto the specimen 37 consisting of a wafer by the system of condenser lenses 34 and the objective lens 35. The position on the specimen 37 hit by the electron beam is scanned in two dimensions by the deflector 36. The region on the specimen illuminated by the beam can be moved by moving the specimen stage 38 in the X- and Y-directions arbitrarily. The deflector 36 and the specimen stage 38 are driven by driver circuits 39 and 40, respectively, which in turn are controlled by the control processing unit 32.

Secondary electrons, for example, produced by the incidence of the electron beam EB on the specimen 37 are detected by a secondary electron detector 41. The output signal from the detector 41 is supplied as image data representative of the specimen surface topography to the control processing unit 32 via an amplifier 42 and via an A/D converter 43. In the method described herein, secondary electrons are used. However, any signal can be used as long as it can be derived from the specimen as the electron beam hits the specimen, such as reflected electrons or absorption current.

The image data supplied to the control processing unit 32 is sent to the image memory 44, where the data is stored. The data stored in the image memory 44 is read out and supplied to an image processing unit 45, where the accuracy in stitching pattern elements is measured based on the image data. The control processing unit 32 has an image data display means capable of displaying the supplied image data, image data stored in the image memory 44, image data processed by the image processing unit 45, and other data. The operation of this structure is next described.

Figure 2:
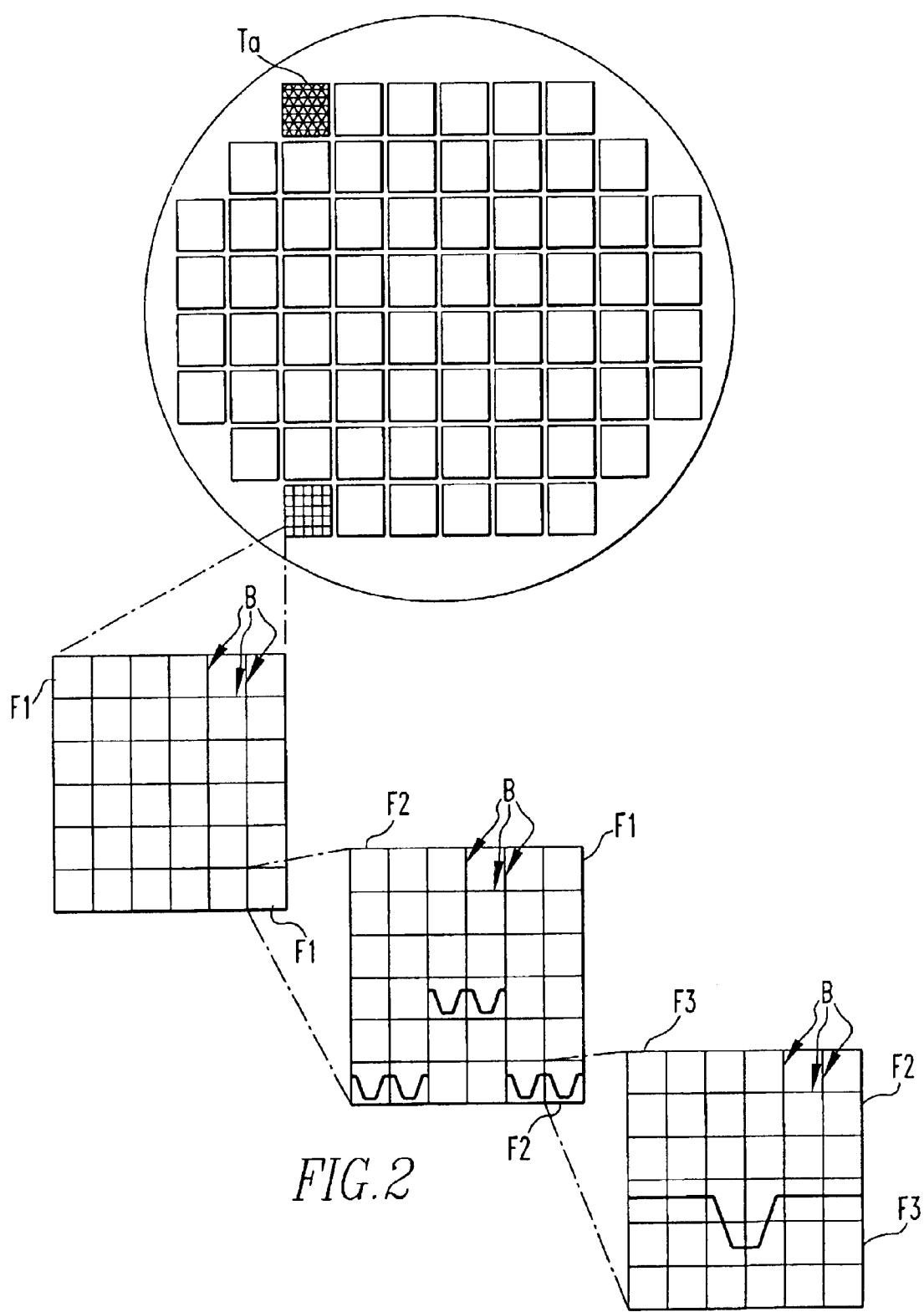
FIG. 2 schematically illustrates the relations of chips and fields to a wafer on which the chips and fields are formed.
Figure 3A:
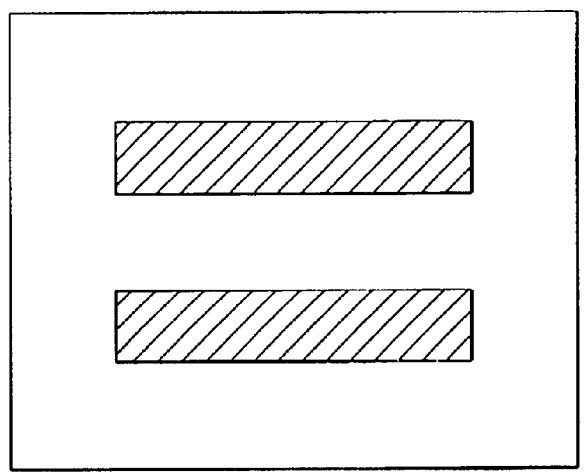
FIGS. 3(a)–3(c) illustrate deviations of pattern elements at field interfaces.
Figure 3B:
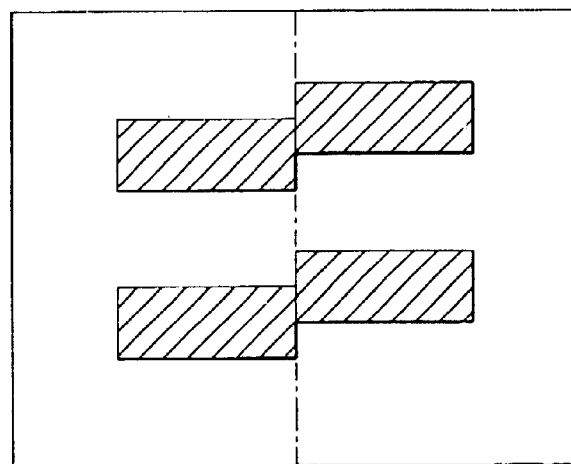
Figure 3C:
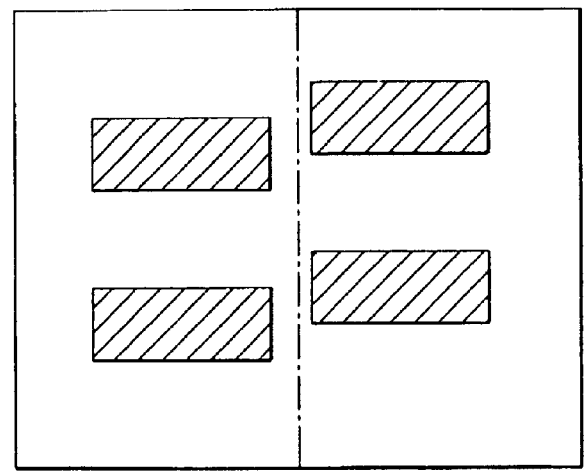

A wafer having chips T over which a pattern has been written by the electron beam lithography system shown in FIG. 1 is used as the specimen 37. Where a pattern is drawn by the lithography system shown in FIG. 1, the pattern is written into a certain chip Ta (FIG. 2) only by one deflection system such that no boundaries are created in gates or contact holes which affect the performance of the LSI device. This chip Ta is used as a reference chip.

Then, a reference image is collected using this reference chip. The coordinates of field boundaries and shot boundaries of chips other than the reference chip Ta, i.e., chips to be inspected, are known at the time of lithographic drawing. The control processing unit 32 controls the specimen stage 38 and the deflector 36 according to the known coordinates. The electron beam is scanned across portions of the reference chip Ta of the specimen 37 corresponding to the aforementioned boundaries. The resulting output signal from the detector 41 is accepted as an image signal into an image memory 44 via the amplifier 42, the A/D converter 43, and the control processing unit 32. At this time, image signals (reference images) derived from the reference patterns are stored together with their coordinates.

Figure 5:
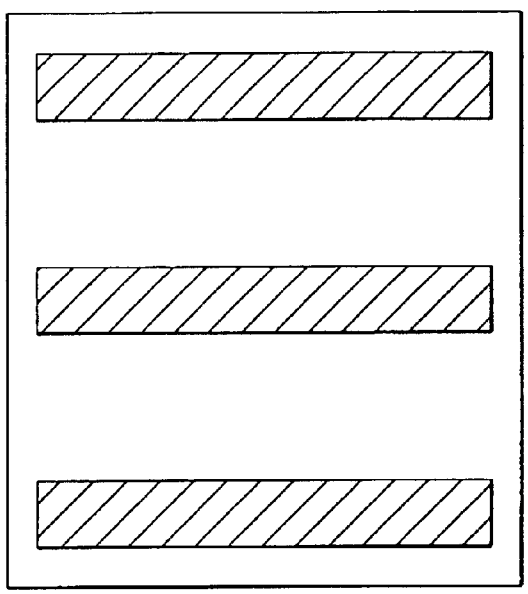
FIG. 5 is a diagram showing one example of a sequence of accepted reference image elements.

The magnification in taking the reference images is set equal to or lower than the magnification in inspecting other chips for the following reason. The reference images produce no deviation. Experiment has shown that, if the original image is taken at a low magnification (e.g., one eighth in an extreme case), and if the image is enlarged up to the size used for inspection by interpolation or other image processing techniques, the properties of the reference images are not lost. Conversely, the reference images can be taken at a magnification greater than that used at the time of inspection. However, the field of view is narrowed, increasing the number of reference images with undesirable results.

Where a repeating pattern exists within the field of view, it is not necessary to accept the whole field of view as a reference image. One or plural patterns may be accepted as a reference image and stored. FIG. 5 shows one example of an accepted reference image. In this case, the reference image includes three pattern elements. Only one of these pattern elements can be used as a reference image.

Then, an image of each inspected chip is accepted. The inspection system shown in FIG. 4 automatically accepts images of inspected chips successively under inspection conditions. The images are stored in the image memory 44 together with coordinates. In particular, the control processing unit 32 controls the driver circuit 40 for the specimen stage 38 under predetermined conditions. Each inspected region on the wafer specimen 37 is brought to the optical axis of the electron beam. The processing unit 32 controls the deflector 36 via the driver circuit 39 and scans the electron beam across each inspected region.

Figure 6:
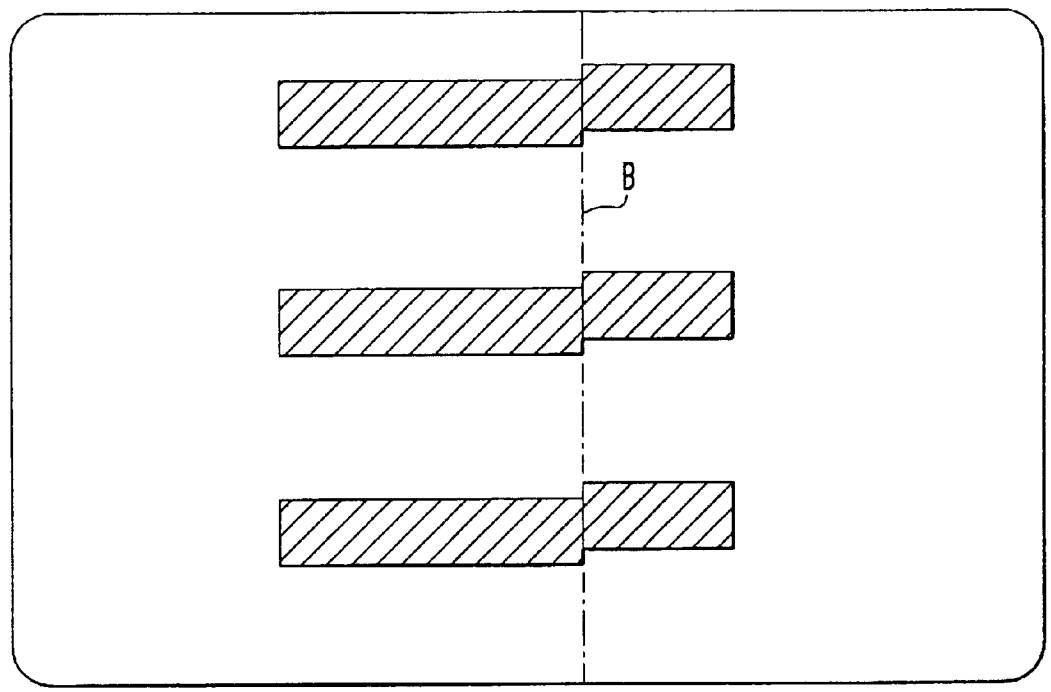
FIG. 6 is a diagram showing one example of an inspected image.

The electron beam is scanned across each inspected region and signals indicating resulting secondary electrons are detected. The signals are stored in the image memory 44 together with the coordinates. After completion of the acceptance of the images of all the inspected regions, each inspected image is compared with the reference image corresponding to the coordinates of the inspected region by the image processing unit 45. Deviations at field boundaries or shot boundaries are detected, if any. FIG. 5 shows the reference image as mentioned previously. FIG. 6 shows an image derived from an inspected region corresponding to the reference image shown in FIG. 5. In FIG. 6, line B indicates a boundary at which stitchings are made.

The detection of the deviations is carried out precisely using a software making use of various sophisticated feature extraction algorithms. The images of the detected portions are marked with rectangles or circles. The coordinates of the center of each region are calculated and, at the same time, the amount of deviation is calculated.

Figure 7:
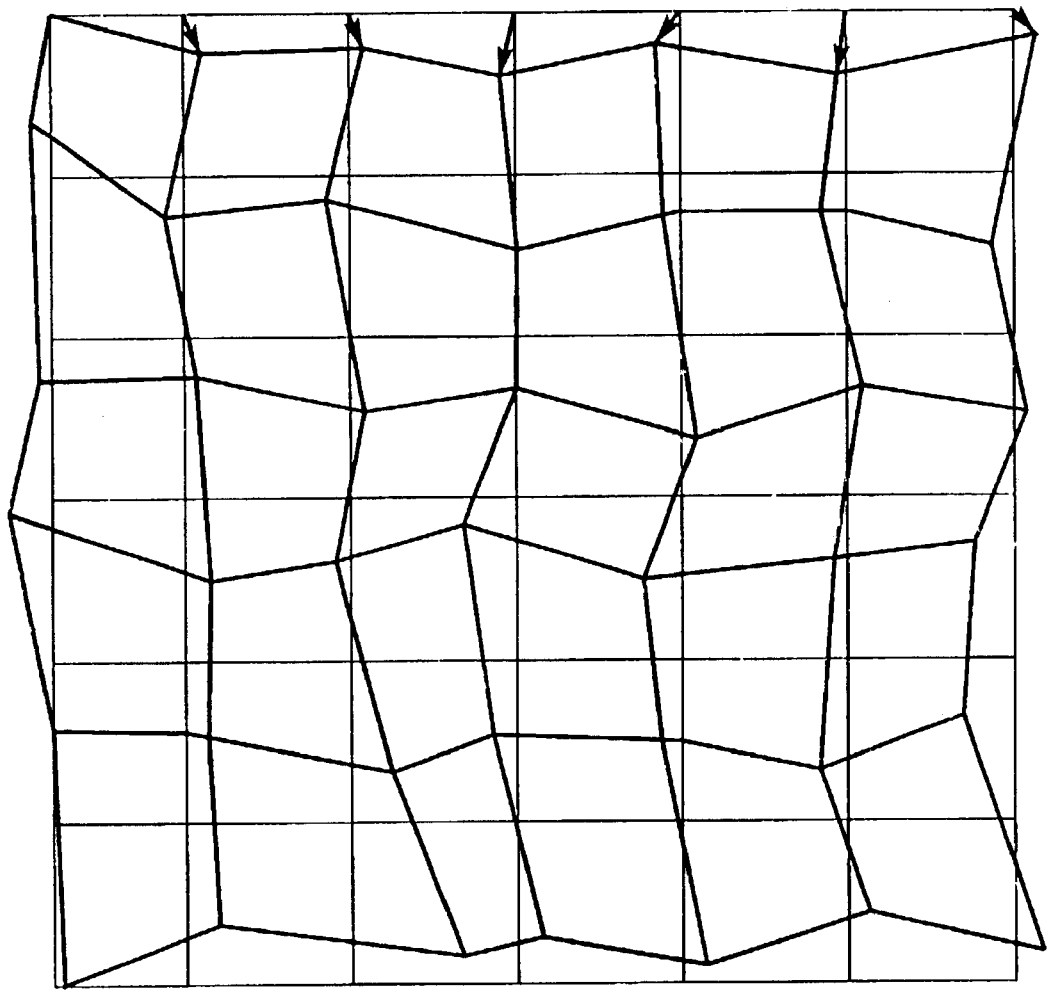
FIG. 7 is a diagram illustrating a wafer map that represents inaccuracies in stitching pattern elements in terms of vectors.

After completion of measurements of the amounts of deviations, the amounts of deviations are displayed graphically or in the form of a map to facilitate grasping the results visually. Examples of such a map include a wafer map indicating the results of a measurement of the whole wafer, a chip map indicating the results of a measurement of one chip, and a field map indicating the results of a measurement of one field. Where the results are displayed, if the amount and direction of the deviation are represented in terms of a vector, then the user can easily understand the results. One example of a wafer map using vectors is shown in FIG. 7, where the solid lines indicate vector expressions based on results of measurements. The thin lines indicate ideal vector expressions. The lines connecting the front ends of the vectors are herein referred to as vector expressions.

Where a wafer map is displayed, the average value of deviations of sides of each chip taken in the X- and Y-axis directions, respectively, is displayed in the form of a vector. Where a chip map is displayed, the average value of deviations of plural stitched pattern elements at boundaries is displayed in the form of a vector. Thus, one can easily grasp the state, or deviation, more precisely. It is possible to grasp the tendency of deviations of stitchings of pattern elements from these maps. A portion of the electron beam lithography system that should be readjusted can be easily judged from the tendency.

In accurately measuring the amounts of deviations at the boundaries, remeasurements are made for all the inspected regions. The procedures for the remeasurements are as follows. The wafer specimen is moved into the center of the first inspected region found to have deviated. An image signal is accepted at a high magnification. The magnification is calculated from the amount of deviation measured during detection. The magnification used for remeasurement is set for the readjustment, i.e., the first magnification is increased many fold.

After all high-magnification images have been accepted in this way, the amounts of deviations of the images are remeasured and stored as a database. The amounts of deviations are measured by adding this process step. The amounts of deviations measured accurately in this way are displayed in the form of a map.

As mentioned previously, a pattern is written into a certain chip only by one deflection system such that no boundaries are created in gates or contact holes which affect the performance of the LSI device, and this is used as a reference chip. It is cumbersome, however, to create a special chip having a critical pattern that has no boundaries and greatly affects the performance of the LSI prior to inspection and measurement. Therefore, the reference image can be accepted as an alternative method as follows.

For example, where plural identical patterns exist on a wafer, if the pattern on one region has a boundary but the pattern on another region has no boundary, then the pattern having the boundary is used as a reference pattern. The pattern having the boundary is used as an inspected pattern. If the same pattern as the pattern on the inspected region exists near a field boundary or on a different region of the chip and has no boundary, then the pattern can be stored as a reference image. Where the same pattern does not exist within the field of view, it is possible to know the location of the pattern within another field of view by comparing the pattern with a CAD (computer-aided design) pattern used for designing an LSI.

Deviations at boundaries can be directly detected by image processing as described above. To carry out the detection relatively simply, a method of indirectly calculating the amount of deviation by image matching can be used. Specifically, the above-described concept consists of inspecting a pattern having a boundary based on a pattern having no boundary and measuring the amount of deviation at the boundary on the pattern. On the other hand, in the following method, an image containing a boundary is compared against a reference image containing a boundary, and the relative values of their amounts of deviations at the boundaries are measured.

Figure 8A:
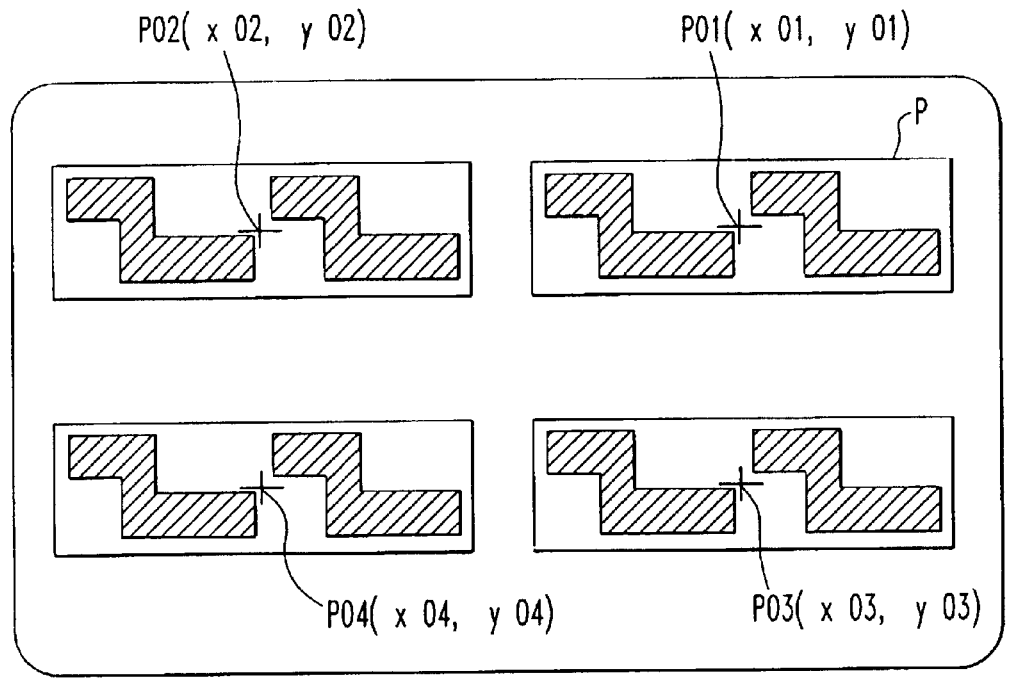
FIGS. 8(a)–8(b) are diagrams illustrating image matching processing performed where repeating pattern elements exist.

For example, as shown in FIG. 8(a), a certain region P within the field of view is registered as an image of a pattern used as a target in specifying the position of the region P within the field of view. The image of the pattern used as a target is hereinafter simply referred to as the "target image". This field of view is herein referred to as the reference field of view. A region on the specimen corresponding to this reference field of view is a reference region. This registration may be effected by selecting or specifying regions while the operator is observing the scanned image. Alternatively, any desired one may be selected from repeating patterns within a reference field of view by an image processing technique. This registered target image is compared against the image in the reference field of view (reference image) to know whether there is a match. Matching image portions within the reference field of view are extracted. The coordinates of the extracted image portions are registered as P01, P02, P03, and P4.

In the reference field of view of FIG. 8(a), if there are four identical patterns, and if a region P surrounding the right upper pattern is registered as a target image, the coordinates of the other identical patterns are automatically registered by image matching techniques. Of course, the registration may be effected manually by the operator.

Figure 8B:
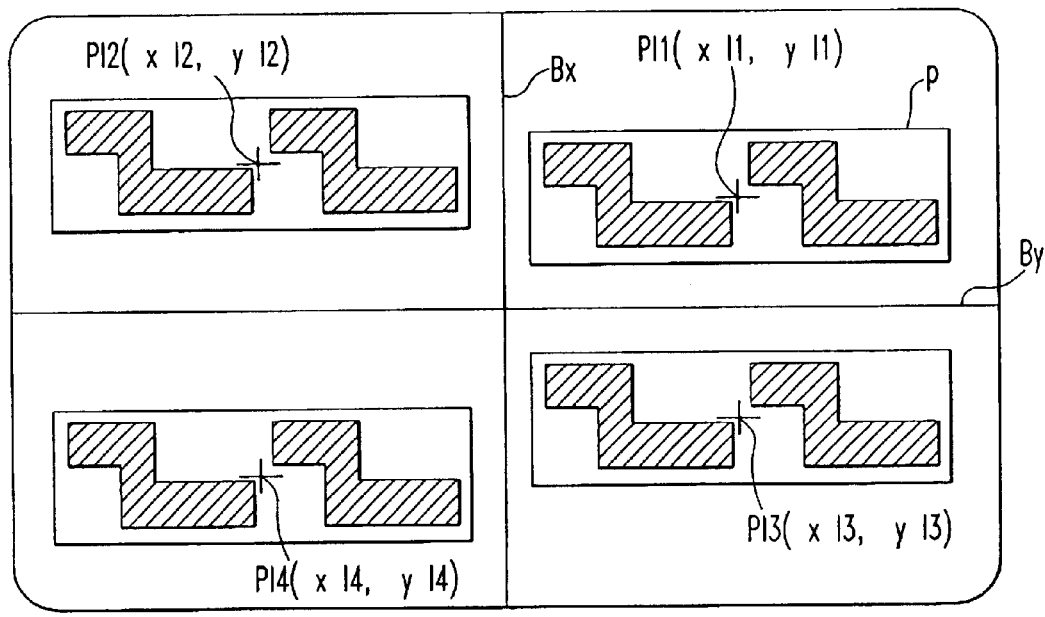
Figure 10:
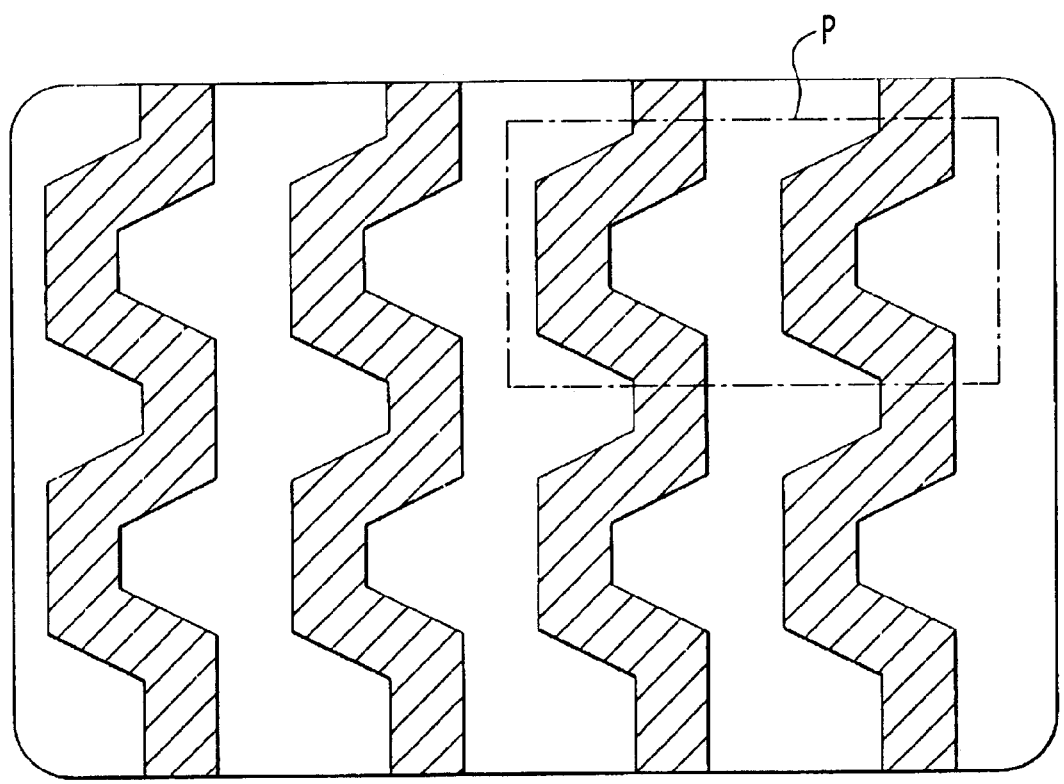
FIG. 10 is a diagram illustrating another example of a specified region of a reference image.

Then an inspected image as shown in FIG. 8(b) is compared against the target image to know whether there is a match. The matching image portions are extracted. Regions on the specimen which correspond to this inspected image are inspected regions. The coordinates of the extracted image portions are registered as PI1, PI2, PI3, and PI4. The coordinates P01, P02, etc. are compared with the coordinates PI1, PI2, etc. Thus, the amounts of deviations at various portions can be computed. If the coordinates P01, P02, etc. are uniquely defined by the features of the pattern, the position can be in the center, the left upper corner, or any other position. In FIG. 8(a), Bx and By show the boundaries at which stitchings are made. The drawn patterns within the regions P shown in FIG. 8(a) are completely within the extents of the regions P. In the case of FIG. 10, designation and registration may be done such that a region P partially cuts off a continuous pattern to be drawn.

The theory of calculation of the amounts of deviations is as follows. First, it is assumed that an inspected image PI1 is coincident in position with the coordinates P01 of the reference image. Then, the deviation of the coordinate PI2 of the inspected image from the coordinate PI1 is given by:

$$(PI2-PI1)-(P02-P01)=(PI2-P02)$$

where (PI2–PI1) is a positional vector of PI2 as viewed from PI1, (P02–P01) is a positional vector of P02 as viewed from P01, and (PI2–P02) is a deviation vector of PI2 from P02 (i.e., where based on P02). Accordingly, it can be seen that the drawn region including PI2 deviates a distance equal to (PI2–P02) as viewed from a drawn region including PI1.

From these relations, in the examples of FIGS. 8(a) and 8(b), the deviation of a drawn region (PI3–P03) as viewed from a drawn region including PI1, the deviation of a drawn region (PI4–P04) as viewed from a drawn region including PI1, and so forth, can be found. Of course, the calculated amount of deviation varies according to the assumption. Therefore, horizontal misalignment between right and left regions is taken as a deviation of the left region from the right region. Vertical misalignment between upper and lower regions is taken as a deviation of the lower region from the upper region. In this way, deviations are treated in a unified manner.

In this unified treatment, it is assumed that a drawn region including PI4 is coincident in position with drawn regions including PI2 and P02, respectively. The deviation of a drawn region including PI4 from the drawn region including PI2 is given by:

$$(PI4-PI2)-(P04-P02)=(PI4-P04)$$

Figure 9:
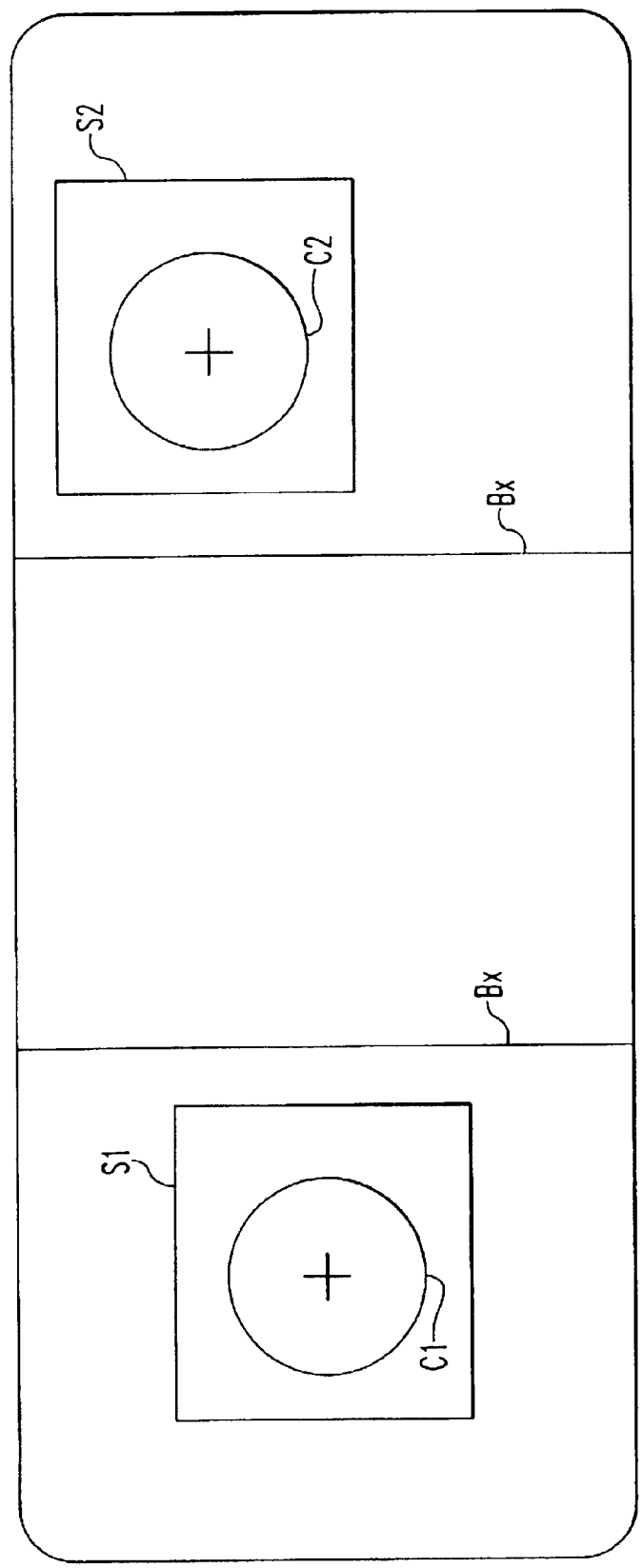
FIG. 9 is a diagram illustrating processing for measuring deviations of the positions of contact holes.

In this way, shifts of the two adjacent drawn regions with respect to each other are found. In this case, these two drawn regions are not always required to be in direct contact with each other. Rather, it is only necessary that the two regions be within the same field of view as viewed from a scanning electron beam. This concept is especially important where shifts of pattern elements not in direct contact with each other are discussed. One example is shown in FIG. 9, where a third drawn region is interposed between a drawn region including contact hole C1 and a drawn region including contact hole C2, and shifts of the contact holes C1 and C2 are detected.

Where the third drawn region is located between the drawn region including the contact hole C1 and the drawn region including the contact hole C2 in this way, some care must be exercised in setting the field of view (scanned region) for inspection. That is, a field of view (scanned region) used for an inspection should be so set that some location at a boundary is brought to the center. Accordingly, if any location at the boundary Bx on the left side of FIG. 9 is brought to the center, the contact hole C2 on the right side may not be within the field of view (scanned region). In this case, the magnification for the scanning is lowered to widen the field of view (scanned region) for inspection, or the coordinates of the center of the field of view (scanned region) for inspection is set midway between the positions of C1 and C2 of FIG. 9.

Figure 11:
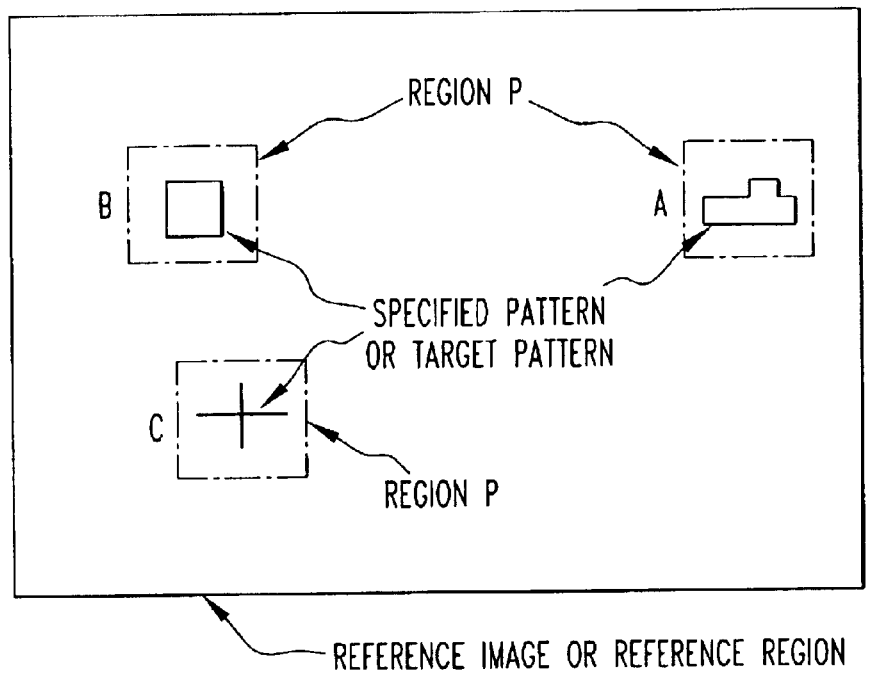
FIG. 11 is a diagram illustrating one example of a specified pattern being different in shape from each other.
Figure 11:
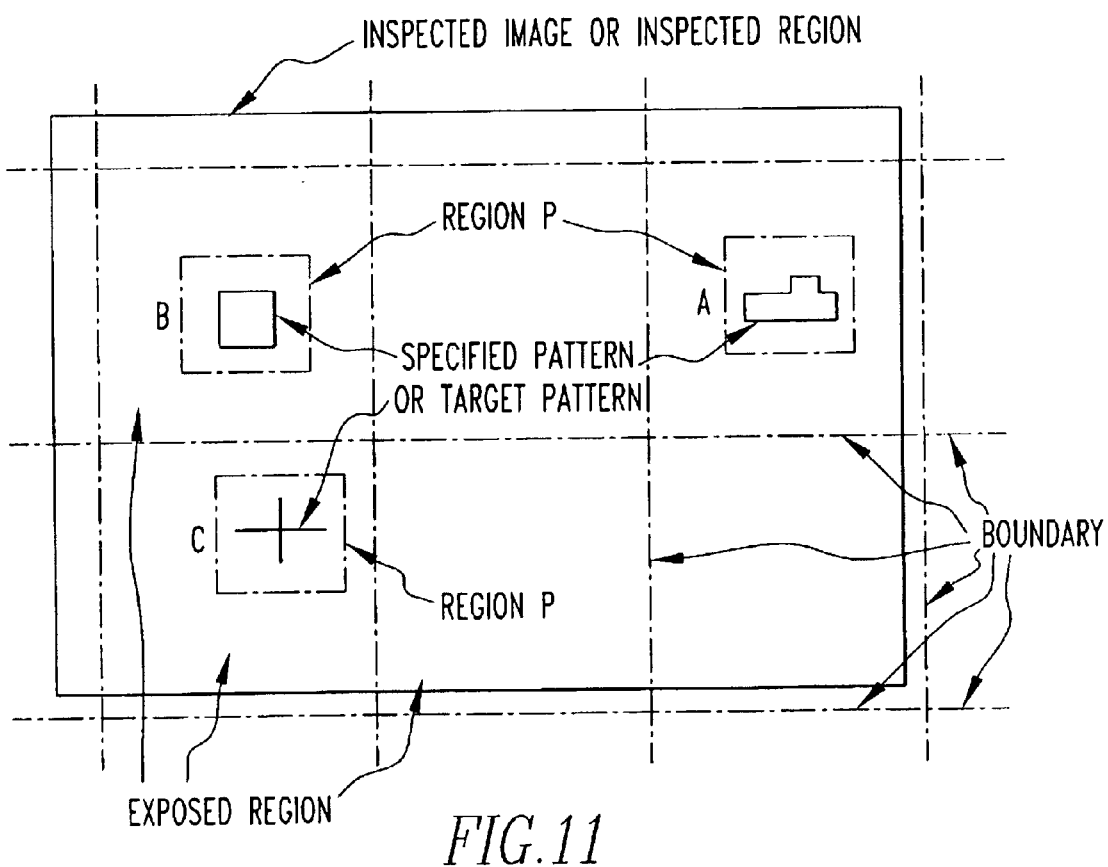

Note that this target image or images are not always one in kind or shape within the same reference field of view. Pattern elements of different geometries within the same reference field of view may be treated as target images. In particular, a region of a pattern of geometry A is taken as a first target image, as shown in FIG. 11. A region of a pattern of different geometry B is taken as a second target image. A region of a pattern of geometry C is taken as a third target image. The coordinates of these target images are detected, and the values of their relative positions can be found.

Numerical data, such as P01, P02, etc. or (P02–P01), (P04–P02), etc., directly found from images within the reference field of view may be created from CAD data or pattern data. As such, if deviations are present at boundaries within the reference field of view, numerical data used for comparison can use design values free from deviations. Furthermore, such numerical data may be treated as attribute data about images (reference image) within the reference field of view or about the image of the target pattern.

Where numerical data created from CAD data or pattern data is treated as attribute data about an image (reference image) in the reference field of view, the following improved method is used to offer greater convenience.

It is better to compare plural "target image elements" in an image (reference image) within a reference field of view with numerical data derived from CAD data or pattern data to check whether the target image elements are shifted with respect to each other. The amounts of shifts are treated as attribute data about the "target image elements" within the reference field of view. For example, in the reference field of view shown in FIG. 8(*a*), extracted coordinates of the "target image elements" are P01, P02, and so forth. The actually measured difference between coordinates P01 and P02 is given by (P02–P01). If the difference between coordinates created from CAD data or pattern data and corresponding to the actually measured values of the coordinates P01 and P02 is (P02'–P01'), then the difference between the actually measured values and the CAD data or pattern data is set equal to:

$$(P02'-P01')-(P02-P01)=\Delta P021$$

This difference is taken as an attribute of the reference image.

In comparison with the reference image of FIG. 8(*a*), the positional relation of PI2 in the inspected image of FIG. 8(*b*) to PI1 is given by:

$$(PI2-PI1)-((P02-P01)+\Delta P021)=(PI2-PI1)-(P02'-P01')$$

If it is assumed that the relation PI1–P01'=0 (based on the first target pattern) holds, then (PI2–P02') gives the deviation at PI2 of the inspected image corrected using CAD data or pattern data from P02 of the reference image having shifts at its boundaries.

The aforementioned difference may be modified to:

$$P01'-P01=\Delta P01, P02'-P02=\Delta P02, \ldots$$

In the above-described comparison, we can also introduce the relation:

$$(PI2-PI1)-((P02-P01)+(\Delta P02-\Delta P01)) =(PI2-PI1)-(P02'-P01')$$

If it is assumed that PI1–P01'=0 (based on a first target pattern), this may be set equal to (PI2–P02').

The above-described method assumes that the reference field of view contains every target pattern within the same field of view. It is not always required that every target pattern be contained within the same field of view. That is, plural target images, such as first and second target images, are extracted from separately obtained images. The spaces (such as (P02–P01), (P04–P02), etc.) between them are found from CAD data or the like and can be contained in attribute data. Instead of having attribute data, plural target images may be synthesized into one reference image.

Then, PI1, PI2, etc. or (PI2–PI1), (PI4–PI2), etc. are found for inspected images derived from inspected regions as mentioned previously. They are compared with each other and their deviations are found.

If only one pattern existing on a chip has a boundary, the following procedures are effected. Portions of this pattern not containing this boundary are extracted as parts of the pattern on the inspected image by an image processing technique. The positional relations among the extracted portions are determined using numerical values as derived from CAD data. The image free from boundary deviations is artificially synthesized using the numerical data. This function is herein referred to as retouching function. This image can be taken as a target image.

In creating the image free from boundary deviations, the design pattern element in the inspected location can be known by examining the CAD pattern corresponding to the coordinates of this location. In consequence, a synthesized image free from boundary deviations can be easily created.

Furthermore, the obtained image data including the boundary can be sent to a personal computer. The image can be displayed on this computer. An image can be created by manually tracing the contour of the image to correct the shape of the boundary. Alternatively, a two-valued (black-and-white) image or a filtered gray-level image is created and can be sent as a target image or reference image to the system of FIG. 4.

Where a CAD pattern is used as a target image or a reference image, the CAD pattern is downloaded into a dedicated computer. A user observes the pattern on the CAD monitor. A virtual region including pattern elements located on the opposite sides of a boundary, or spanning the boundary, is specified. The pattern element in this region can be downloaded as a target image or reference image into the inspection system of FIG. 4. The CAD pattern referred to herein can include a CAD pattern obtained by reconstructing a CAD pattern into pattern data adapted for delineation.

Care is to be exercised in using a CAD figure as a target image or reference image in this way. The quality (e.g., contrast) of images such as images obtained by an SEM (scanning electron microscope) used in an inspection system and images obtained by CAD are not always uniform. This will cause error in doing image matching between both kinds of images. An extreme case is that a contrast reversal between them takes place. In this case, identical patterns may not be recognized as the same.

Accordingly, where a contrast reversal has occurred between an inspected image and a reference image, data about the contrast is included in attribute data about the reference image. For example, where the contrast of the reference image has occurred, the attribute data is set to −1; otherwise, the data is set to 1. When image matching is done, if the attribute data is −1, the contrast of the reference image is reversed and then normal processing is performed. Generally, many image matching functions include a function of reversing the image contrast prior to normal processing and so this contrast-reversing function is utilized.

When image matching is done, if error occurs due to a difference in property between two images other than contrast (e.g., quality), image matching between them may be previously done. The degree of error may be forecast and used as one item of the attribute data about the reference image.

This concept can also be applied to a case in which the reference and inspected images are taken by different devices or under different measurement conditions. In such a case, both images may slightly differ in magnification. One image may have rotated relative to the other. The degree of orthogonality between X-direction scan and Y-direction scan of the deflector 36 of the SEM may slightly deviate. Accordingly, the difference of the reference image from the inspected image in magnification, the difference in angular position, or error in the degree of orthogonality may be taken as attribute data about the reference image. During image matching, the reference image may be corrected using this attribute data prior to normal processing.

When the operator of the instrument establishes "target image", he or she searches the field of view of the reference image for a pattern that is suitable as the target image and specifies a range of the target image to determine the size of the field of view specified as the target image. However, it is considerably cumbersome for the operator to perform the operation for specifying the range of the target image, apart from the operation for searching for a pattern to be treated as the target image. Furthermore, when an inspected area is specified, the operator is preferably required to specify only its position.

Figure 13A:
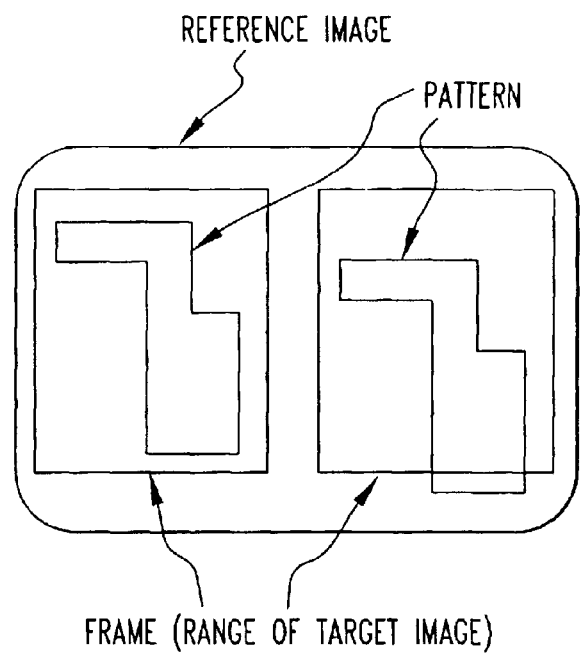
FIG. 13 is a diagram illustrating an inspection method in which a reference image is bisected and target frames are established.

From a practical point of view, therefore, it is convenient to fix the range and position of the target image relative to the field of view of the reference image or inspected image. For example, FIG. 13(a) shows a case in which two target images are set in left and right portions, respectively, within a field of view on the assumption that the boundary line at the junction runs vertically across a reference image. In FIG. 13(a), frames indicate the ranges of the target images. Of course, a mode of operation used where the boundary line at the junction runs horizontally may also be prepared. Different modes of operation may be used selectively according to the purpose.

Figure 13B:
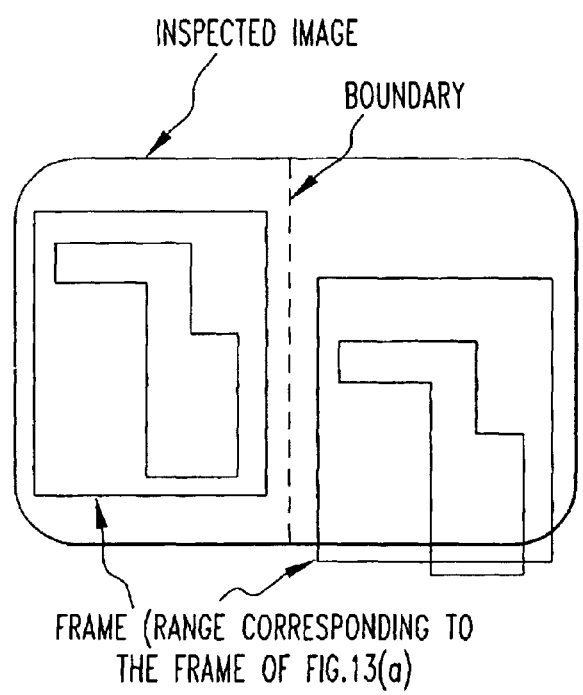

FIG. 13(b) shows an inspected image displayed on an SEM monitor, the image being obtained when a region to be inspected is specified by the instrument's operator. Frames shown in FIG. 13(b) indicate ranges corresponding to the frames indicative of the ranges of target images in FIG. 13(a). The fields of view of the inspected images shown in FIG. 13(b) have been considerably shifted with respect to the fields of view of the reference images shown in FIG. 13(a). Furthermore, a part of the target image on the right inspected image is outside the field of view. Even in this case, the inspection can be done sufficiently. The instrument is easy to operate for the following reasons. If the range of a target image does not contain the whole pattern, or if a part of the pattern is lost, the reference and inspected images can be compared provided that the range of the target image in the reference image and the range of the inspected image (around the range of the target image specified by the reference image) contain a common part.

In the example of FIG. 13(a), the whole field of view of the image is bisected into left and right portions. A target image range is set around the center of each of these two portions such that this range occupies 30 to 40% (e.g., 35%) of the whole area of the field of view. Experiment shows that where a repeating pattern is present, if the target image size is set too small, an identical pattern appearing at plural positions in the inspected image may be misdetected. Furthermore, it may be thought that a target image range is set equal to the whole area of one of two halves obtained by bisecting a target image (i.e., 50% of the whole area of the field of view). In practice, however, if the range of the target image is set too large, this range covers the boundary because of the mechanical accuracy of the movable specimen stage 38 on which an inspected specimen 37 is carried. This may result in a misjudgment. Therefore, the size of the target image (the ratio of the area to the whole field of view) is preferably 30 to 40%.

In the above description, the range and position of the target image are "fixed". This means that the range and position of the target image do not need to be adjusted every time. The range and position of the target image may be adjusted only when the need arises. To permit the instrument's operator to recognize the range of the target image, the range may be displayed in terms of different levels of contrast. If any kind of indicia indicating a frame or range is displayed, greater convenience will be offered. The displayed frame indicates the range of the target image within the reference image. In addition, if the range of the target image is shown within the inspected image after comparison between the reference and inspected images, it is useful in checking whether the results of the inspection are incorrect.

The method of gaining a reference image, the method of comparing an inspected image with the reference image, the method of measuring deviations at boundaries, and the method of displaying the results of measurements have been described. The method of gaining the reference image, the method of comparing an inspected image with the reference image, and measurements of deviations at boundaries are summarized as follows.

Figure 12A:
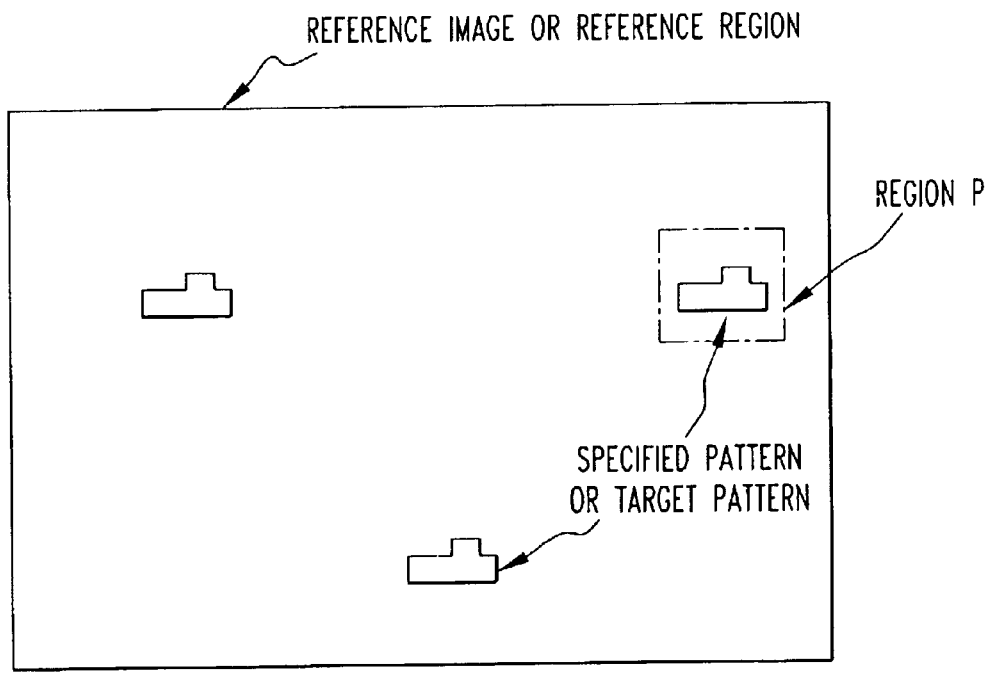
FIGS. 12(a)–12(c) are diagrams showing examples of a reference image having no boundary, an inspected image and a reference image having boundaries.

The theory is as follows. First, a special reference chip having no boundary deviation is created. A reference image is gained using this reference chip (see FIG. 12(a)). The reference image (of FIG. 12(a)) is compared with a pattern having a boundary and located in an inspected region (of FIG. 12(b)), and the amount of deviation at the boundary is measured. A large number of such measurement values are derived over the whole wafer surface, for example. A diagram showing the distribution of the amounts of deviations over the whole wafer surface is displayed using the measurement values.

A first method of obtaining the reference image is based on the above-described theory. A special reference chip having no boundary deviation is created. A reference image (of FIG. 12(a)) is obtained using this reference chip. In practical applications, however, it is difficult to create such a special reference chip having no boundary deviation. Accordingly, we have devised the following method.

A second method of obtaining the reference image consists of discussing CAD data or the like to search for a pattern that is identical with the pattern in an inspected region and has no boundary deviation and obtaining an image of a field of view not including the boundary as a reference image.

In a third method of obtaining the reference image, if the pattern within the field of view for obtaining a reference image has a boundary, the pattern can be used as a reference image showing a correct positional relation by using CAD data or the like regarding the region spanning the boundary. This method makes it possible to use plural reference patterns derived from different fields of view as reference images by determining positional relations by the use of CAD data.

Figure 12B:
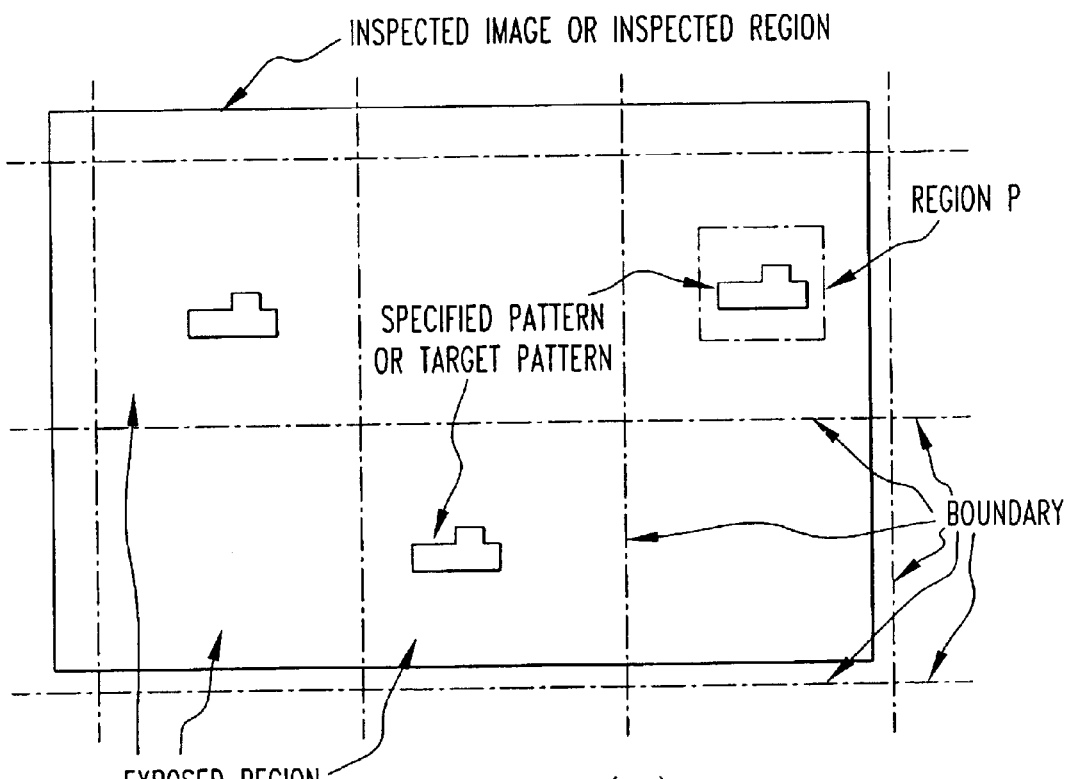
Figure 12C:
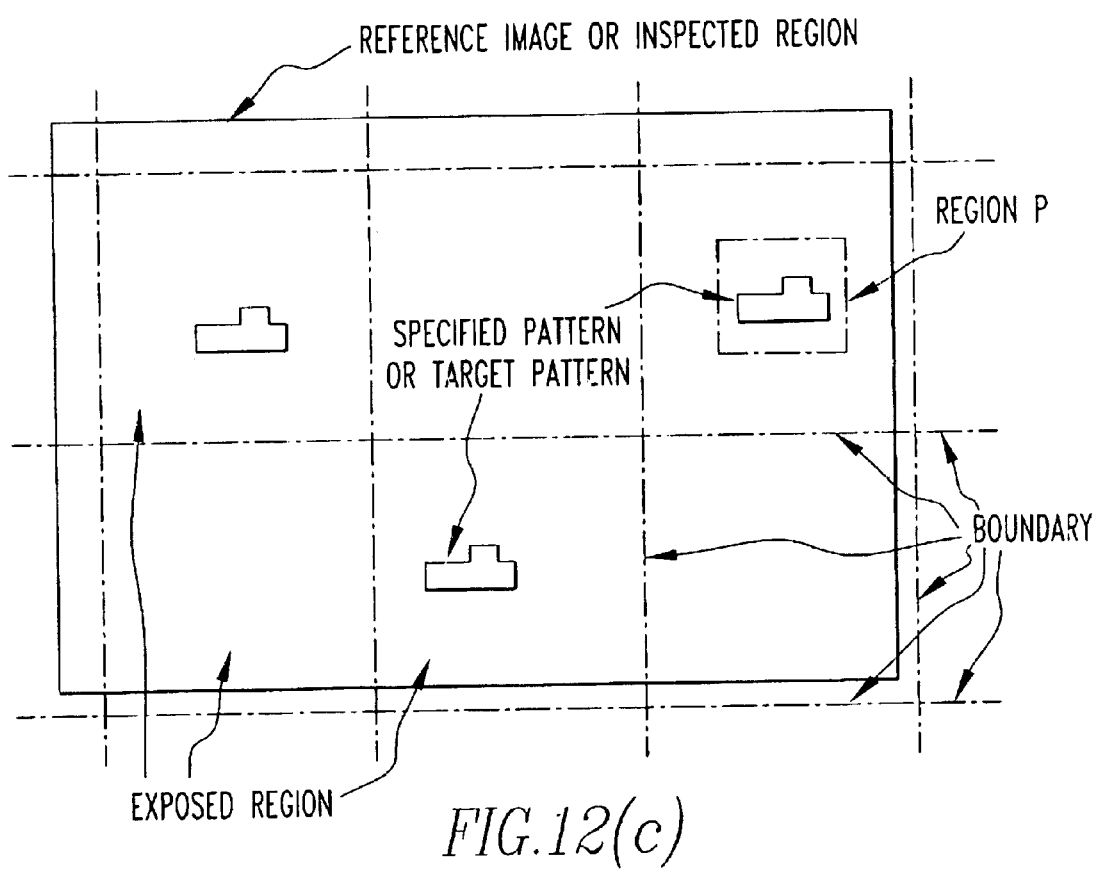

A fourth method of obtaining the reference image is to use an image from a field of view that might have a boundary deviation as a reference image intact (see FIG. 12(c)). This is used for measurements of relative amounts of deviations as described later.

Methods of measuring deviations at boundaries are summarized as follows. A first method of comparing an inspected image with a reference image and measuring the deviation at a boundary consists of comparing the inspected image (FIG. 12(b)) with the reference image (FIG. 12(a)) having no boundary deviation and measuring the amount of deviation at the boundary.

A second method of comparing an inspected image with a reference image and measuring the deviation at the boundary consists of comparing an inspected image (of FIG. 12(b)) with a reference image (of FIG. 12(c)) that might have a deviation at a boundary and measuring the amount of relative deviation at the boundary.

This method of measuring the amounts of relative deviations is useful because the purpose of measurement may not be associated with deviations at boundaries of individual pattern elements but it may be to know the distribution of amounts of deviations at the boundaries over the whole wafer or over the whole chip on which a pattern is drawn. For example, if deviations in a pattern identical with a pattern contained in the reference image are measured using the single reference image over the whole wafer, variations in deviation among various portions of the wafer can be sufficiently grasped provided deviations are present within the reference image.

While the preferred embodiment of the present invention has been described, the invention is not limited thereto but rather various changes and modifications are possible. In the above embodiment, after all images of inspected portions are accepted, deviations at boundaries are detected and measured. Alternatively, whenever an image is gained from an inspected portion, the deviation at the boundary may be detected and measured.

Where a reference pattern having no boundary is built into certain chips on wafers, the certain chips are not always required to be fabricated on all the wafers of the same kind.

The inspected objects are not limited to wafers on which patterns have been photolithographically defined directly by the electron beam lithography system. Masks used for exposure of LSI patterns and fabricated by an electron beam lithography system, a laser lithography system, or a light-and-electron mix-and-match technique can be similarly inspected and measured. Furthermore, masks created by a stepper exposure system using light, an electron beam, UV, or EUV as a light source may be similarly inspected and measured. Moreover, daughter masks created by combining patterns or pattern elements, which are created by optically exposing master masks by ⅕ reduction projection technology, can be similarly inspected and measured.

An exposure mask consists of a thick quartz glass on which a pattern is drawn. In the inspection stage, the material defining the pattern may still be resist or the fabrication of the mask has progressed considerably. Furthermore, a stencil mask consisting mainly of a silicon wafer instead of glass and an X-ray mask can also be inspected.

In the embodiment described above, patterns are mainly created by an electron beam that is scanned or has a cross section of a variable shape. Obviously, however, the inspection method in accordance with the present invention can also be applied to a pattern created by exposing desired regions in succession by a cell projection exposure technique and splicing them together, provided the pattern has boundaries. In the cell projection exposure technique, desired regions are exposed simultaneously by light, an electron beam, an ion beam, or laser light. In this context, "exposure" may be wider in scope than "lithography". Both terminologies are herein construed widely so that both embrace each other.

In the above-described embodiment, an electron beam inspection machine is taken as an example of a charged-particle beam inspection machine. The invention is not limited thereto. The invention can also be applied to other kinds of beam inspection machines, such as laser beam inspection machines, ion beam inspection machines, and optical inspection machines.

Furthermore, in the above embodiment, an image is gained by a scanning method. Obviously, similar inspection can be performed by a method of projecting or enlarging an image by electrons or light and obtaining the image by a CCD camera or the like.

Additionally, in the above embodiment, positional data are made ancillary to image data for the sake of illustration. Conversely, image data may be made ancillary to positional data.

As described in detail thus far, the present invention makes it possible to quickly and accurately inspect the accuracy at which individually exposed regions of an exposed pattern are connected within an inspected area, by comparing data obtained from the inspected area with data obtained from a reference area. At this time, concerning the difference between each position at which a certain pattern appears within the reference area and the corresponding position derived from CAD data or pattern data, data about these differences is made ancillary to image data about the reference area. The results of the comparisons are corrected using the differences. Therefore, if data about the reference area indicates that there is any deviation at the boundary, the desired purpose can be fulfilled.

When the positions at which a certain pattern appears within the reference area are detected, data indicating the characteristics of an image is made ancillary to data about the image in the reference area. The data about the image is corrected using the ancillary data. Therefore, if CAD data or pattern data is used, the positions at which the certain pattern appears within the reference area can be detected precisely. In this way, the desired purpose can be fulfilled.

When a certain pattern is established, the whole field of view of the reference image is automatically divided into two parts. A frame of a given size is established around the center of the field of view of each part. Therefore, it is easy to establish the certain pattern. Hence, the desired purpose can be achieved.

Having thus described my invention with the detail and particularity required by the Patent Laws, what is desired protected by Letters Patent is set forth in the following claims.

The invention claimed is:

1. A method of inspecting accuracy at which desired regions are stitched on a material on which regions have been exposed successively to form a pattern, said method comprising the steps of:

establishing an inspected area over plural different exposed regions, said inspected area containing at least two pattern positions at which a certain pattern appears;

detecting a signal arising from the inspected area and detecting said pattern positions from said detected signal;

finding a difference between each pattern position within a reference area corresponding to said inspected area and a respective one of pattern positions based on CAD data or pattern data and making data about the difference ancillary to image data about said reference area;

comparing the pattern positions in said inspected area with the pattern positions in said reference area; and correcting results of the comparisons using said difference, whereby inspecting the accuracy at which the exposed regions within said inspected region are stitched.

2. The method of claim 1, wherein the difference between each pattern position where said certain pattern appears within said reference area and a respective one of pattern positions based on the CAD data or pattern data is a relative value expressed based on one of the pattern positions where said certain pattern appears.

3. The method of claim 1, wherein the difference between each pattern position where said certain pattern appears within said reference area and a respective one of the pattern positions based on the CAD data or pattern data is a difference between each pattern position relative to an arbitrary pattern position where said certain pattern appears within the reference area and a respective one of the pattern positions being based on corresponding CAD data or pattern data relative to a pattern position corresponding to said arbitrary pattern position.

4. A method of inspecting accuracy at which desired regions are stitched on a material on which regions are exposed successively to form a pattern are stitched, said method comprising the steps of:

establishing an inspected area over plural different exposed regions, said inspected area containing at least two pattern positions at which a certain pattern appears;

detecting a signal arising from the inspected area and detecting said pattern positions from said detected signal;

correcting first data about the reference area corresponding to said inspected area by the use of second data made ancillary to said first data to thereby find pattern positions within the reference area at which the certain pattern appears; and comparing the pattern positions within said inspected area with found pattern positions.

5. The method of claim 4, wherein at least a part of said first data is created based on CAD data or pattern data, and wherein said second data contains data about image contrast reversal.

6. A method of inspecting accuracy at which desired regions are stitched on a material on which regions are exposed successively to form a pattern are stitched, said method comprising the steps of:

establishing an inspected area over plural different exposed regions, said inspected area containing at least two pattern positions at which a certain pattern appears;

creating a reference image based on data about a reference area corresponding to said inspected area;

bisecting a whole field of view of said reference image into subfields of view;

setting a frame having a given size around center of each of said subfields of view;

detecting pattern positions within each frame at which a certain pattern appears;

detecting a signal produced from said inspected area and forming an inspected image;

detecting pattern positions within the inspected area corresponding to the certain pattern within each set frame in said reference image; and comparing each pattern position within said inspected area with a respective one of pattern positions within said reference area.

7. The method of claim 6, wherein each of said frames has a size that is 30 to 40% of the whole field of view of the reference image.

8. The method of claim 6 or 7, wherein each of said frames is visibly displayed in at least one of the field of view of said reference image and the field of view of the inspected field of view.

* * * * *

UNITED STATES PATENT AND TRADEMARK OFFICE
CERTIFICATE OF CORRECTION

PATENT NO.     : 6,723,973 B2
DATED          : April 20, 2004
INVENTOR(S)    : Manabu Saito It is certified that error appears in the above-identified patent and that said Letters Patent is hereby corrected as shown below:

Title page,
Insert Item -- [30]     Foreign Application Priority Data
                Nov. 13, 2001   (JP)……………………..2001-0347745 --.

Column 15,
Line 49, "a pattern are stitched," should read -- a pattern, --.

Column 16,
Line 20, "a pattern are stitched," should read -- a pattern, --.
Line 29, "around center" should read -- around the center --.

Signed and Sealed this

Sixteenth Day of November, 2004

JON W. DUDAS
*Director of the United States Patent and Trademark Office*